(12) United States Patent
An et al.

(10) Patent No.: US 12,351,888 B2
(45) Date of Patent: Jul. 8, 2025

(54) COMPOSITIONS AND METHODS FOR IMPROVED PRECIOUS METAL EXTRACTION FROM ORE

(71) Applicant: SOLUGEN, INC., Houston, TX (US)

(72) Inventors: Jun Su An, Houston, TX (US); Frederyk Ngantung, Houston, TX (US)

(73) Assignee: SOLUGEN, INC., Houston, TX (US)

( * ) Notice: Subject to any disclaimer, the term of this patent is extended or adjusted under 35 U.S.C. 154(b) by 537 days.

(21) Appl. No.: 17/914,321

(22) PCT Filed: Mar. 25, 2021

(86) PCT No.: PCT/US2021/024233
§ 371 (c)(1),
(2) Date: Sep. 23, 2022

(87) PCT Pub. No.: WO2021/195430
PCT Pub. Date: Sep. 30, 2021

(65) Prior Publication Data
US 2023/0110976 A1   Apr. 13, 2023

Related U.S. Application Data

(60) Provisional application No. 62/994,879, filed on Mar. 26, 2020.

(51) Int. Cl.
*C22B 11/08*   (2006.01)
*C04B 24/06*   (2006.01)
*C04B 28/04*   (2006.01)
*C04B 103/22*  (2006.01)

(52) U.S. Cl.
CPC .............. *C22B 11/08* (2013.01); *C04B 24/06* (2013.01); *C04B 28/04* (2013.01); *C04B 2103/22* (2013.01)

(58) Field of Classification Search
CPC ........... C22B 11/08; C22B 1/00; C04B 24/06; C04B 28/04; C04B 2103/22; Y02P 10/20
See application file for complete search history.

(56) References Cited

U.S. PATENT DOCUMENTS

| | | | |
|---|---|---|---|
| 4,913,730 A | 4/1990 | Deschenes et al. | |
| 5,104,445 A | 4/1992 | Dubrovsky et al. | |
| 2011/0067603 A1* | 3/2011 | Constantz | C04B 14/28 106/286.6 |
| 2015/0202794 A1 | 7/2015 | Nakamura et al. | |

OTHER PUBLICATIONS

McClelland, et al., Agglomeration-Heap Leaching Operations in the Precious Metals Industry I.C.8945, U.S. Department of the Interior, Bureau of Mines, Jan. 1, 1983 (22 p.) (Year: 1983).*
Written Opinion of the International Searching Authority in PCT/US2021/024233 dated Aug. 13, 2021 (Year: 2021).*
PCT/US2021/024233 International Search Report and Written Opinion dated Aug. 13, 2021 (12 p.).
McClelland, G.E. et al., "Agglomeration-Heap Leaching Operations in the Precious Metals Industry I.C. 8945," U.S. Department of the Interior, Bureau of Mines, Jan. 1, 1983 (22 p.).
Gokelma, Mertol et al., "A Review on Alternative Gold Recovery Reagents to Cyanide," Journal of Materials Science and Chemical Engineering, vol. 4, No. 8, pp. 8-17, Aug. 2016 (11 p.).
Argall, JR., George O., "The Golden Glow at Battle Mountain: The golden glow at Battle Mountain; Pennzoil Spin-Off Starts Life Nearly Debt Free as Largest in US Gold," Engineering and Mining Journal, vol. 187, No. 2, pp. 32-37, Feb. 1986 (6 p.).
Todd, L.R. et al., "Gold and Silver Ore Processing at Duval's Battle Mountain, Nevada, Operation," 1st International Symposium on Precious Metals Recovery, Reno, Nevada, Jun. 10, 1984 (21 p.).
Lesage, Karel et al., "Plasticising Mechanism of Sodium Gluconate Combined with PCE," Advances in Cement Research, vol. 27, No. 3, pp. 163-174, Mar. 2015 (12 p.).
Beixing, Li et al., "Comparison of the Retarding Mechanisms of Sodium Gluconate and Amino Trimethylene Phosphonic Acid on Cement Hydration and the Influence on Cement Performance," Construction and Building Materials, vol. 168, pp. 958-965, Apr. 20, 2018 (8 p.).
Ma, Suhua et al., Influence of Sodium Gluconate on the Performance and Hydration of Portland Cement, Construction and Building Materials, vol. 91, pp. 138-144, Aug. 30, 2015 (7 p.).
Wikipedia: Portland Cement, Mar. 17, 2020 (https://en.wikipedia.org/wiki/Portland_cement) (15 p.).
McPartland, Jack et al., "SME Presentation: The Use of Cement during Grinding for Reduction of Cyanide Consumption during Agitated Leaching of a Gold Ore Containing Reactive Sulfide Minerals," McClelland Laboratories, Inc., Feb. 26, 2020 (22 p.).
Golden Grain Group: Sodium Gluconate, Good Concrete Admixture in Construction Industry, Mar. 13, 2020 (https://www.goldengraingroup.com/sodium-gluconate.html) (1 p.).
Taggart, Arthur F., "Handbook of Mineral Dressing: Ores and Industrial Minerals," Wiley Engineering Handbook Series, 1945, p. 12-26 (2 p.).

* cited by examiner

Primary Examiner — Daniel C. McCracken
(74) Attorney, Agent, or Firm — CONLEY ROSE, P.C.

(57) ABSTRACT

A method for precious metal extraction comprises contacting a precious metal-containing ore with an improved cyanide extraction agent under conditions suitable for the formation of a coated precious metal-containing ore where the extraction agent comprises (i) a cement and (ii) a cement retarder; and contacting the coated precious metal-containing ore with a cyanide solution to form soluble precious metal complexes. A composition for gold extraction comprising: (i) a cement (ii) a cement retarder and (iii) an inorganic cyanide salt.

28 Claims, 1 Drawing Sheet

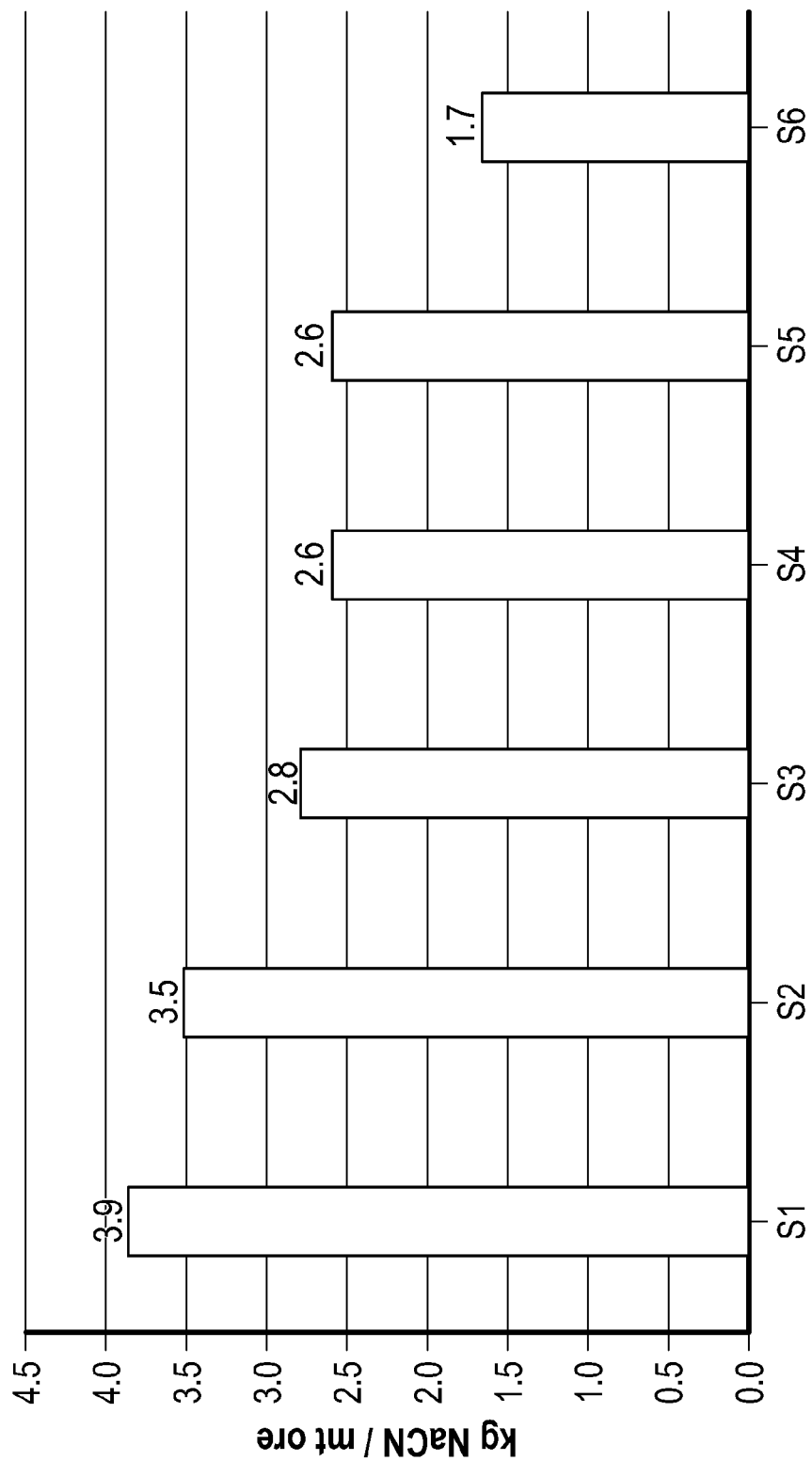

COMPOSITIONS AND METHODS FOR IMPROVED PRECIOUS METAL EXTRACTION FROM ORE

CROSS-REFERENCE TO RELATED APPLICATIONS

This application is a 35 U.S.C. § 371 national stage application of PCT/US2021/024233 filed Mar. 25, 2021, and entitled "Compositions and Methods for Improved Precious Metal Extraction from Ore," which claims benefit of U.S. provisional patent application Ser. No. 62/994,879 filed Mar. 26, 2020, and entitled "Compositions and Methods for Improved Precious Metal Extraction from Ore," each of which is hereby incorporated herein by reference in its entirety for all purposes.

FIELD

The present disclosure relates to generally hydrometallurgy. More particularly, the present disclosure relates to hydrometallurgical methods of extracting precious metals from metal-containing ores.

BACKGROUND

Over 90% of worldwide gold production employs a process technology that utilizes cyanide. Gold is very resistant to oxidation. As a result, ordinary acids such as sulfuric acid, nitric acid and hydrochloric acid are not very effective. While being widely utilized, gold cyanidation is controversial due to cyanide's toxicity. Due to this toxicity, some states in the USA have banned the use of cyanide (e.g., Montana, Wisconsin). As a result, there are external pressures, such as regulatory bodies and public perception as well as internal pressures (HSE departments, etc.) for mining processes, to reduce cyanide usage or to look for cyanide alternatives.

SUMMARY

Disclosed herein is a method for precious metal extraction comprising contacting a precious metal-containing ore with an improved cyanide extraction agent under conditions suitable for the formation of a coated precious metal-containing ore where the extraction agent comprises (i) a cement and (ii) a cement retarder; and contacting the coated precious metal-containing ore with a cyanide solution to form soluble precious metal complexes.

Also disclosed herein is a composition for gold extraction comprising: (i) a cement (ii) a cement retarder and (iii) an inorganic cyanide salt.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 1 is a graph of the kg of sodium cyanide utilized per amount of ore.

DETAILED DESCRIPTION

As previously described, there are pressures to reduce cyanide usage or to look for cyanide alternatives in gold production processes. While shifting to a cyanide alternative is the most attractive solution, that approach may not be realistic. The life cycle of a mine is on the order of 20-50 years making shifting a mineral process to a different reagent not very realistic. In the absence of a cyanide alternative, another approach would be to utilize less cyanide in the gold extraction process. Accordingly, an ongoing need exists for methods and compositions that improve the efficiency of cyanide utilization in gold extraction.

Disclosed herein are methods and compositions for the removal of precious metals from precious-metal containing ores. In an aspect, the method comprises contact of the precious-metal containing ores with an extraction agent that is hereinafter termed an improved cyanide extraction (ICE) agent.

In an aspect, an ICE agent of the present disclosure comprises a cement. Herein, a cement refers to a binder or a material that sets, hardens, and adheres to other materials to bind them together. In an aspect, the ICE agent comprises a cementitious material, alternatively a hydraulic cement. Herein a hydraulic cement refers to a cement that sets and hardens by reaction with water. Hydraulic cements generally comprise calcium oxide, silicon dioxide, aluminum oxide, ferric oxide, and sulfur oxide. Nonlimiting examples of hydraulic cements suitable for use in the present disclosure include Portland cements (e.g., classes A, B, C, G, and H Portland cements), pozzolana cements, gypsum cements, phosphate cements, high alumina content cements, silica cements, high alkalinity cements, shale cements, acid/base cements, magnesia cements such as Sorel cements, fly ash cement, zeolite cement systems, cement kiln dust cement systems, slag cements, micro-fine cement, metakaolin, and any combination thereof. In an aspect, the ICE agent comprises Portland cement which is a mixture of calcium oxide, silicon dioxide, aluminum oxide, ferric oxide, and sulfur oxide.

In an aspect, the ICE agent comprises a cement retarder. A cement retarder functions to alter the rheology of the cement thereby controlling the time when a slurry will set hard. Cement retarders are used to keep the cement slurry viscous and pumpable at expected temperatures and for the amount of time required to place the slurry. Cement retarders function to decrease the rate of cement hydration, acting in a manner opposite to that of accelerators. In an aspect, a cement retarder suitable for use in the present disclosure extends the thickening time of the cement by equal to or greater than about 20%, alternatively by equal to or greater than about 30% or alternatively by equal to or greater than about 40%. Herein, the thickening time refers to the duration that a cement slurry remains in a fluid state and is capable of being pumped.

In an aspect, a cement retarder suitable for use in the present disclosure is a molecule capable of behaving as a chelant or chelating agent. Herein, a chelant refers to molecule that forms two or more separate coordinate bonds between a polydentate (multiple bonded) ligand and a single central atom. In an aspect, the metals chelated by the dispersant (e.g., the central atom) are sodium, potassium, or calcium.

A cement retarder suitable for use in the present disclosure may comprise any chelant compatible with the other materials of the ICE agent and able to chelate an alkali metal or alkaline earth metal. Cement retarders suitable for use in the present disclosure, include without limitation, aldonic acid, uronic acid, aldaric acid, sodium lignosulfate, sodium tetraborate, sodium pentaborate, salts thereof, derivatives thereof, or combinations thereof.

In an alternative aspect, the cement retarder comprises sodium gluconate, oxidation products of sodium glucarate, salts thereof, derivatives thereof, or combinations thereof. In such aspects, the cement retarder additionally comprises n-keto acids and $C_2$-$C_5$ diacids in amounts of less than about 50 wt. %, alternatively less than about 10 wt. % or alternatively less than about 5 wt. % based on the total weight of the retarder. A twenty-second aspect which is the composition of the twenty-first aspect wherein the chelant is a mixture of aldaric, uronic acids.

In another aspect, the chelant is a mixture of aldaric, uronic acids, and their respective counter-cation. For example, the chelant may be comprised of glucaric acid, gluconic acid, glucuronic acid, glucose oxidation products, and gluconic acid oxidation products. In an aspect, the chelant is comprised of sugar oxidation products comprising of disaccharides, oxidized disaccharides, uronic acid, and aldaric acid. In another aspect, the chelant is comprised of gluconic acid, glucaric acid, glucuronic acid, n-keto-acids and C2-C6 diacids. In an aspect, the chelant further comprises a counter-cation comprising an alkali earth metal of group 1 and group 2. Alternatively, the counter-cation comprises ammonium.

A cement retarder of the type disclosed herein may be present in the ICE agent in an amount of from about 0.1% by weight of cement (BWOC) to about 5 wt. % BWOC, alternatively from about 0.65% to about 5% or alternatively from about 0.1% to about 1%.

Any suitable methodology may be used for preparing an ICE agent of the type disclosed herein. For example, the cement retarder may be pre-blended with the dry cement to form a physical admixture. Alternatively, the cement retarder may be pre-mixed with a solvent such as water prior to addition of the cement. The water may be fresh water or salt water, e.g., an unsaturated aqueous salt solution or a saturated aqueous salt solution such as brine or seawater. The water may be present in the amount from about 20 to about 180 percent by weight of cement (BWOC), alternatively from about 28 to about 60 percent BWOC, alternatively from about 36 to about 66 percent BWOC. In yet another aspect, the cement retarder may be in liquid form which is then added to dry cement.

An ICE agent of the type disclosed herein may be used for the extraction of precious metals from ore. For example, the ICE agent may be utilized to extract gold metal from ore. It is to be understood that the extraction of gold metal from ore using the compositions and methods disclosed herein is exemplary, and it is contemplated that other metal extractions may be carried out using the compositions and methods disclosed herein. In an aspect, the process of gold extraction using an ICE agent is a hydrometallurgical process comprising mineral processing, metallurgical extraction, and metal purification.

In an aspect, the method comprises coating of an ore with an ICE agent of the type disclosed herein. Coating of the ore with an ICE agent of the type disclosed herein may be carried out using any suitable methodology. For example, the ICE agent can be combined with the ore on a dry basis or combined with a liquid and provided as a slurry or liquid mixture. It is contemplated that the ICE agent may coat the ore so as to provide a substantially uniform coating that covers the available surface area of the ore. The resultant material is termed a coated ore. Herein, "substantially covers the available surface area of the ore" refers to greater than about 70% of the surface area of the ore being coated by the ICE agent, alternatively greater than about 75, 80, 85, or 90%.

The method further comprises comminution of the coated ore. Comminution is the process in which ore particles are liberated from gangue material through progressive size reduction in the form of crushing, grinding, cutting, vibrating or combinations thereof. Comminution can be accomplished through a single stage or a multiple stage process. Each of the stages can be any combination of particle size-reduction techniques, including the following: jaw crusher, cone crusher, gyratory crusher, hammer crusher, ball mill, rod mill, pebble mill, semi-autogenous grinding (SAG) mill, semi-autogenous ball (SAB) mill, autogenous (AG) mill, or high-pressure-grinding-rod mill. Water may be added to the comminuted coated ore to produce a slurry with a concentration of 10% to 50%, typically 15% to 30% ore, by total weight of the slurry.

In an aspect, the method further comprises contacting the slurry with an aqueous cyanide solution. The cyanide solution may contain an inorganic cyanide salt such as sodium cyanide, potassium cyanide, or combinations thereof. Contacting of the slurry with an aqueous cyanide solution results in the formation of soluble gold cyanide complexes that can be further processed to form gold metal. For example, the soluble gold cyanide complexes can be recovered, and electroplating can be used to recover the gold in the soluble gold cyanide complexes. This reaction is depicted with the use of sodium cyanide in Reaction 1.

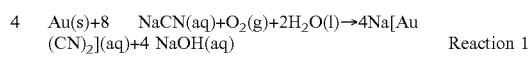

4   Au(s)+8   NaCN(aq)+$O_2$(g)+2$H_2O$(l)→4Na[Au(CN)$_2$](aq)+4 NaOH(aq)                    Reaction 1

In an aspect, an ICE agent of the type disclosed herein substantially covers the surface of the ore with a substantially uniform coating. Herein, a substantially uniform coating refers to a coating having an thickness across the coated surface that varies by less than about 20%, alternatively less than about 10% or alternatively less than about 5%. In one or more aspects, extraction of gold from a coated ore of the type disclosed herein is carried out with the utilization of less cyanide than an otherwise similar extraction carried out using an ore not coated with an ICE agent of the type disclosed herein. For example, an amount of cyanide that is utilized to extract an amount of gold, from an ore can be denoted as X. In an aspect, the amount of cyanide utilized to extract the same amount of gold from an ore coated with an ICE agent of the type disclosed herein is equal to or less than about 0.90X, alternatively equal to or less than about 0.80X, alternatively equal to or less than about 0.70X, or alternatively equal to or less than about 0.60X.

ADDITIONAL ASPECTS

Aspects disclosed herein include:

A first aspect which is a method for precious metal extraction comprising contacting a precious metal-containing ore with an improved cyanide extraction agent under conditions suitable for the formation of a coated precious metal-containing ore wherein the extraction agent comprises (i) a cement and (ii) a cement retarder; and contacting the coated precious metal-containing ore with a cyanide solution to form soluble precious metal complexes.

A second aspect which is the method of first aspect wherein the cement comprises a hydraulic cement.

A third aspect which is the method of any of the first through second aspects wherein the cement comprises Portland cements, pozzolana cements, gypsum cements, phosphate cements, high alumina content cements, silica cements, high alkalinity cements, shale cements, acid/base cements, magnesia cements such as Sorel cements, fly ash cement, zeolite cement systems, cement kiln dust cement systems, slag cements, micro-fine cement, metakaolin, or a combination thereof.

A fourth aspect which is the method of any of the first through third aspects wherein the cement comprises Portland cement.

A fifth aspect which is the method of any of the first through fourth aspects wherein the cement retarder is a chelating agent.

A sixth aspect which is the method of any of the first through fifth aspects wherein the cement retarder extends the thickening time of the cement by equal to or greater than about 20%.

A seventh aspect which is the method of any of the first through sixth aspects wherein the cement retarder comprises aldonic acid, uronic acid, aldaric acid, sodium lignosulfate, sodium tetraborate, sodium pentaborate, salts thereof, derivatives thereof, or a combination thereof.

An eighth aspect which is the method of any of the first through seventh aspects wherein the cement retarder comprises sodium gluconate, oxidation products of sodium glucarate, salts thereof, derivatives thereof or a combination thereof.

A ninth aspect which is the method of any of the first through eighth aspects wherein the cement retarder further comprises n-keto acids and $C_2$-$C_6$ diacids in amounts of less than about 50 wt. % based on the total weight of the retarder.

A tenth aspect which is the method of any of the first through ninth aspects wherein the cement retarder is present in an amount of from about 0.1 wt. % to about 5 wt. % based on the weight of cement.

An eleventh aspect which is the method of any of the first through tenth aspects wherein the extraction agent further comprises water.

A twelfth aspect which is the method of any of the first through eleventh aspects wherein the precious metal-containing ore comprises gold.

A thirteenth aspect which is the method of any of the first through twelfth wherein the soluble precious metal complexes comprise gold.

A fourteenth aspect which is a composition for gold extraction, comprising: (i) a cement; (ii) a cement retarder; and (iii) an inorganic cyanide salt.

A fifteenth aspect which is the composition of the fourteenth aspect wherein the cement comprises hydraulic cement selected from the group consisting of Portland cements, pozzolana cements, gypsum cements, phosphate cements, high alumina content cements, silica cements, high alkalinity cements, shale cements, acid/base cements, magnesia cements such as Sorel cements, fly ash cement, zeolite cement systems, cement kiln dust cement systems, slag cements, micro-fine cement, metakaolin, and any combination thereof.

A sixteenth aspect which is the composition of any of the fourteenth through fifteenth aspects, wherein the cement comprises Portland cement.

A seventeenth aspect which is the composition of any of the fourteenth through sixteenth aspects wherein the cement retarder is a chelating agent.

An eighteenth aspect which is the composition of any of the fourteenth through seventeenth aspects, wherein the cement retarder comprises aldonic acid, uronic acid, aldaric acid, sodium lignosulfate, sodium tetraborate, sodium pentaborate, salts thereof, derivatives thereof, or a combination thereof.

A nineteenth aspect which is the composition of any of the fourteenth through eighteenth aspects wherein the cement retarder comprises sodium gluconate, oxidation products of sodium glucarate, salts thereof, derivatives thereof or combinations thereof.

A twentieth aspect which is the composition of any of the fourteenth through nineteenth aspects wherein the cement retarder is present in an amount of from about 0.1 wt. % to about 5 wt. % based on the weight of cement.

A twenty-first aspect which is a composition for gold extraction comprising: (i) a cement (ii) a cement retarder and (iii) an inorganic cyanide salt wherein the cement retarder is a chelant.

A twenty-second aspect which is the composition of the twenty-first aspect wherein the chelant is a mixture of aldaric, uronic acids.

A twenty-third aspect which is the composition of any of the twenty-first through twenty-second aspects wherein the chelant is a mixture of aldaric, uronic acids, and their respective counter-cation.

A twenty-fourth aspect which is the composition of any of the twenty-first through twenty-third aspects wherein the chelant is comprised of glucaric acid, gluconic acid, glucuronic acid, glucose oxidation products, and gluconic acid oxidation products.

A twenty-fifth aspect which is the composition of any of the twenty-first through twenty-fourth aspects wherein the chelant is comprised of sugar oxidation products comprising of disaccharides, oxidized disaccharides, uronic acid, and aldaric acid.

A twenty-sixth aspect which is the composition of any of the twenty-first through twenty-fifth aspects wherein the chelant is comprised of gluconic acid, glucaric acid, glucuronic acid, n-keto-acids and C2-C6 diacids.

A twenty-seventh aspect which is the composition of any of the twenty-first through twenty-sixth aspects wherein the counter-cation comprises of an alkali earth metal of group 1 and group 2.

A twenty-eighth aspect which is the composition of any of the twenty-first through twenty-seventh aspects wherein the counter-cation comprises of ammonium.

EXAMPLES

The presently disclosed subject matter having been generally described, the following examples are given as particular aspects of the subject matter and to demonstrate the practice and advantages thereof. It is understood that the examples are given by way of illustration and are not intended to limit the specification or the claims in any manner.

A leaching test was conducted to investigate the effectiveness of compositions of the type disclosed herein on gold extraction. Specifically, a mechanically agitated bottle roll test was conducted using a gold ore of 75 micron feed size. The pH control additives used were as follows: lime, cement, cement and ICE agent-1 (ICE agent was added at 0.1% wt of cement) or lime ICE agent (ICE agent was added at 0.1% wt of lime). The Key Performance Indicators associated with this test were the amount of NaCN usage, gold recovery and silver recovery. The ore was set in a roller oven for 36 hours, and the recovery was measured using Inductively Coupled Plasma. The results are presented in Table 1.

TABLE 1

| | pH Control | Additional Additive | Au Recovery % | Ag Recovery % | NaCN Consumption kg/mt ore | Lime kg/mt ore | Cement kg/mt ore |
|---|---|---|---|---|---|---|---|
| S1 | Lime | N/A | 95.1 | 50.0 | 3.87 | 6.1 | N/A |
| S2 | Lime | ICE AGENT-1 | 91.1 | 52.0 | 3.52 | 6.1 | N/A |
| S3 | Cement | N/A | 95.6 | 54.5 | 2.79 | N/A | 6.0 |
| S4 | Cement | ICE AGENT-1 | 85.9 | 53.3 | 2.59 | N/A | 6.1 |
| S5 | Cement | Glucoheptonate | 96.1 | 58.8 | 2.60 | N/A | 6.0 |
| S6 | Cement | ICE AGENT-2 | 95.7 | 51.0 | 1.66 | N/A | 6.0 |

As seen in Table 1, gold and silver recovery with the ICE agents of this disclosure were not significantly impacted. As a comparison, the baselines of lime and cement are approximately 95% for gold and 50-54.5% for silver. The run with ICE AGENT-2 resulted in a gold and silver recovery of 95.7% and 51%, respectively.

A surprisingly unexpected benefit of the use of ICE agents of the type disclosed herein is the extent of cyanide consumption. Notably with each iteration of chelating agent, the cyanide consumption decreased suggesting the presently disclosed subject matter could result in utilizing less cyanide.

While aspects of the presently disclosed subject matter have been shown and described, modifications thereof can be made by one skilled in the art without departing from the spirit and teachings of the subject matter. The aspects described herein are exemplary only and are not intended to be limiting. Many variations and modifications of the subject matter disclosed herein are possible and are within the scope of the disclosed subject matter. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present disclosure. Thus, the claims are a further description and are an addition to the aspects of the present invention. The discussion of a reference herein is not an admission that it is prior art to the presently disclosed subject matter, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method for precious metal extraction comprising:
    contacting a precious metal-containing ore with an improved cyanide extraction agent under conditions suitable for the formation of a coated precious metal-containing ore wherein the extraction agent comprises (i) a cement and (ii) a cement retarder; and
    contacting the coated precious metal-containing ore with a cyanide solution to form soluble precious metal complexes.

2. The method of claim 1, wherein the cement comprises a hydraulic cement.

3. The method of claim 1, wherein the cement comprises Portland cements, pozzolana cements, gypsum cements, phosphate cements, high alumina content cements, silica cements, high alkalinity cements, shale cements, acid/base cements, magnesia cements such as Sorel cements, fly ash cement, zeolite cement systems, cement kiln dust cement systems, slag cements, micro-fine cement, metakaolin, or a combination thereof.

4. The method of claim 1, wherein the cement comprises Portland cement.

5. The method of claim 1, wherein the cement retarder is a chelating agent.

6. The method of claim 1, wherein the cement retarder extends the thickening time of the cement by equal to or greater than about 20%.

7. The method of claim 1, wherein the cement retarder comprises aldonic acid, uronic acid, aldaric acid, sodium lignosulfate, sodium tetraborate, sodium pentaborate, salts thereof, derivatives thereof or a combination thereof.

8. The method of claim 1, wherein the cement retarder comprises sodium gluconate, oxidation products of sodium glucarate, salts thereof, derivatives thereof or a combination thereof.

9. The method of claim 1, wherein the cement retarder further comprises n-keto acids and $C_2$-$C_6$ diacids in amounts of less than about 50 wt. % based on the total weight of the retarder.

10. The method of claim 1, wherein the cement retarder is present in an amount of from about 0.1 wt. % to about 5 wt. % based on the weight of cement.

11. The method of claim 1, wherein the extraction agent further comprises water.

12. The method of claim 11, wherein the precious metal-containing ore comprises gold.

13. The method of claim 1, wherein the soluble precious metal complexes comprise gold.

14. A composition for gold extraction, comprising:
    (i) a cement;
    (ii) a cement retarder; and
    (iii) an inorganic cyanide salt.

15. The composition of claim 14, wherein the cement comprises hydraulic cement selected from the group consisting of Portland cements, pozzolana cements, gypsum cements, phosphate cements, high alumina content cements, silica cements, high alkalinity cements, shale cements, acid/base cements, magnesia cements such as Sorel cements, fly ash cement, zeolite cement systems, cement kiln dust cement systems, slag cements, micro-fine cement, metakaolin, and ay combination thereof.

16. The composition of claim 14, wherein the cement comprises Portland cement.

17. The composition of claim 14, wherein the cement retarder is a chelating agent.

18. The composition of claim 14, wherein the cement retarder comprises aldonic acid, uronic acid, aldaric acid, sodium lignosulfate, sodium tetraborate, sodium pentaborate, salts thereof, derivatives thereof, or a combination thereof.

19. The composition of claim 14, wherein the cement retarder comprises sodium gluconate, oxidation products of sodium glucarate, salts thereof, derivatives thereof or a combination thereof.

20. The composition of claim 14, wherein the cement retarder is present in an amount of from about 0.1 wt. % to about 5 wt. % based on the weight of cement.

21. A composition for gold extraction comprising: (i) a cement (ii) a cement retarder and (iii) an inorganic cyanide salt wherein the cement retarder is a chelant.

22. The composition of claim 21, wherein the chelant is a mixture of aldaric, uronic acids.

23. The composition of claim 21, wherein the chelant is a mixture of aldaric, uronic acids, and their respective counter-cation.

24. The composition of claim 21, wherein the chelant is comprised of glucaric acid, gluconic acid, glucuronic acid, glucose oxidation products, and gluconic acid oxidation products.

25. The composition of claim 21, wherein the chelant is comprised of sugar oxidation products comprising of disaccharides, oxidized disaccharides, uronic acid, and aldaric acid.

26. The composition of claim 21, wherein the chelant is comprised of gluconic acid, glucaric acid, glucuronic acid, n-keto-acids and $C_2$-$C_6$ diacids.

27. The composition of claim 21, wherein the counter-cation comprises of an alkali earth metal of group 1 and group 2.

28. The composition of claim 21, wherein the counter-cation comprises of ammonium.

* * * * *